United States Patent
Lee

(10) Patent No.: US 9,448,554 B2
(45) Date of Patent: Sep. 20, 2016

(54) VEHICLE-LOCATION RECOGNITION SYSTEM AND METHOD, AND VEHICLE ASSEMBLY-HISTORY MANAGEMENT SYSTEM AND METHOD USING THE SAME

(71) Applicant: Hyundai Motor Company, Seoul (KR)

(72) Inventor: Jae Hyun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 535 days.

(21) Appl. No.: 13/844,657

(22) Filed: Mar. 15, 2013

(65) Prior Publication Data

US 2014/0188263 A1   Jul. 3, 2014

(30) Foreign Application Priority Data

Dec. 28, 2012  (KR) .................. 10-2012-0156285

(51) Int. Cl.
G05B 19/418        (2006.01)

(52) U.S. Cl.
CPC . *G05B 19/4183* (2013.01); *G05B 2219/31286* (2013.01); *Y02P 90/04* (2015.11); *Y02P 90/10* (2015.11)

(58) Field of Classification Search
CPC .......... G05B 19/4183; G05B 19/4184; G05B 19/41865; G05B 19/4187; G05B 19/4189; G05B 19/41805
USPC .................................................. 700/112–116
See application file for complete search history.

(56) References Cited

U.S. PATENT DOCUMENTS 5,322,156 A * 6/1994 Kakita .................. B62D 65/18
                                                     198/463.3
6,354,716 B1 * 3/2002 Chen .................... G08B 13/184
                                                     250/221
6,484,077 B1 * 11/2002 Unose .............. G05B 19/41895
                                                     701/19
6,732,005 B1 * 5/2004 Bobkin ............ G05B 19/41805
                                                     29/711

(Continued)

FOREIGN PATENT DOCUMENTS

JP        2001-129731 A      5/2001
JP        2008-000892 A      1/2008

(Continued)

OTHER PUBLICATIONS

Claire Swedberg, BMW Finds the Right Tool, RFID Journal, Aug. 4, 2009. http://www.rfidjournal.com/articles/pdf?5104.*

(Continued)

*Primary Examiner* — Mohammad Ali
*Assistant Examiner* — Nathan L Laughlin
(74) *Attorney, Agent, or Firm* — McDermott Will & Emery LLP

(57) ABSTRACT

A vehicle-location recognition system includes an electronic recognition unit provided in a respective vehicle of an ordered set of vehicles which are introduced into an assembling process section, the electronic recognition unit storing an ID number of the respective vehicle therein. A sensor unit detects the electronic recognition unit as the vehicle passes by a location of the sensor unit along the assembling process section. A control unit stores the ID number in sequence order with the ID numbers of the vehicles of the ordered set of vehicles, and determines a location of a particular vehicle in the ordered set of vehicles based on the ordered sequence of stored ID numbers and information on the spacing intervals between vehicles in the assembling process section.

10 Claims, 4 Drawing Sheets

(56) References Cited

U.S. PATENT DOCUMENTS

| | | | | |
|---|---|---|---|---|
| 2003/0058105 | A1* | 3/2003 | Wuestefeld | G01V 8/22 340/556 |
| 2005/0149216 | A1* | 7/2005 | Popplewell | G05B 19/12 700/96 |
| 2007/0074592 | A1* | 4/2007 | Santos | G01D 11/30 73/866.5 |
| 2012/0136475 | A1* | 5/2012 | Kahle | G01S 5/0221 700/182 |
| 2013/0035783 | A1* | 2/2013 | Scheuerman | B62D 65/18 700/230 |

FOREIGN PATENT DOCUMENTS

| | | |
|---|---|---|
| KR | 10-2006-0036331 A | 4/2006 |
| KR | 10-0610800 A | 8/2006 |
| KR | 20080054264 A | 6/2008 |
| KR | 10-1133735 A | 4/2012 |

OTHER PUBLICATIONS

Office Action Korean Patent Application No. 10-2012-0156285 dated Jan. 24, 2014.

\* cited by examiner

VEHICLE-LOCATION RECOGNITION SYSTEM AND METHOD, AND VEHICLE ASSEMBLY-HISTORY MANAGEMENT SYSTEM AND METHOD USING THE SAME

CROSS-REFERENCE TO RELATED APPLICATION

This application claims the benefit under 35 U.S.C. §119(a) of Korean Patent Application No. 10-2012-0156285, filed Dec. 28, 2012, the entire contents of which are incorporated herein by reference.

BACKGROUND OF THE INVENTION

1. Field of the Invention

The present invention relates, in general, to a technology for vehicle-location recognition and vehicle assembly-history is management and, more particularly, to a vehicle-location recognition system and method and a vehicle assembly-history management system and method using the same, enabling precise assembly history management without tags for location recognition of vehicles, irrespective of a worker's working location and his position in the sequence of assembly processes.

2. Description of the Related Art

As the competition between car manufacturers in the global car market intensifies, more emphasis is being placed on the quality of respective manufacturers' cars. In particular, cars that exhibit low durability are generating very little interest in the market.

In addition, assembly operations that are carried out in most manufacturing lines and processes for manufacturing cars are operations that are directly relevant to the durability of finished cars. At present, workers responsible for respective processes carry out the assembly operations using pneumatic tools, electric tools, or the like.

Each pneumatic or electric tool has an assembling torque value which is set by a tool controller, such that when a worker presses an operating button of the tool, the tool carries out an assembling operation with the assembling torque value that was set.

However, the set assembling torque value does not always coincide with the value of the torque actually applied during assembly, and particularly, even if the assembling torque value is precisely applied, the value of the torque actually applied during assembly may not satisfy quality standards due to operational errors of the tool controller, a worker's mistake, or the like.

Thus, advanced automobile manufacturers record and manage actually applied assembling torque values by grafting various sensing technologies onto assembling tools in order to ensure durability of a vehicle.

FIG. 1 shows an assembly history management system for vehicles according to the related art, which manages a history of assembly operations by matching the actually applied assembling torque values with target cars using an RFID system.

That is, when a vehicle having an attached RFID tag 1 passes by a process section in which an RFID sensor 2 is installed, the history management system reads out the RFID tag 1 to identify an ID number of a vehicle that is passing by the process section. Next, the ID number of the vehicle that is positioned in the current assembling process section is inferred using the sequence number from a list of vehicle ID numbers. Hence, when a worker carries out an assembling operation, the system matches the inferred ID number with an actually applied assembling torque value transmitted from a tool controller, and stores the corresponding data.

However, in the conventional technology, it is required that a worker has to carry out an assembling operation within a defined assembling process section. If the worker carries out his assembling operation out of the defined assembling process section, an inferred target object and an actual target object do not coincide with each other, and the precise management of assembling history is therefore lost. In an actual assembling environment, workers often carry out their assembling operations outside of a defined assembling process section, so it is not possible to precisely manage a history of assembling operations.

Korean Unexamined Patent Publication No. 10-2008-054264 describes a vehicle management method using RFID and a computer-readable recording medium recording a program therein for implementing the management method. However, the above technology has a problem in that, because tags have to be attached to all vehicles, a tag-attachment process has to be separately added, and battery-charging states of tags have to be periodically checked and if needed, tags have to be replaced.

The description regarding the related art is provided only for understanding of the background of the invention, so it should not be construed by ordinarily skilled persons in the art to be admitted to be the related art.

SUMMARY OF THE INVENTION

Accordingly, the present invention has been made keeping in mind the above problems occurring in the related art. The present invention provides a vehicle-location recognition system and method and a vehicle assembly-history management system and method using the same, enabling precise assembly history management without the use of tags for location recognition of vehicles. The system and method operate irrespective of a worker's working location and position in the sequence of assembly processes.

In order to achieve the above object, according to one aspect of the present invention, there is provided a vehicle-location recognition system including: an electronic recognition unit provided in one vehicle which is introduced into an assembling process section in which vehicles are conveyed in a sequence order while maintaining a certain spacing interval between vehicles, and storing an ID number of the one vehicle; a sensor unit provided at a first end of the assembling process section for sensing the electronic recognition unit of the one vehicle when the one vehicle passes by a location of the sensor unit along the assembling process section; and a control unit for storing the ID number of the electronic recognition unit sensed by the sensor unit, for storing information relating to the sequence order and spacing interval of the vehicles conveyed in the assembling process section, and for determining a location in the assembling process section of a particular vehicle among the vehicles conveyed in the assembling process section.

The control unit may extract the ID number of the electronic recognition unit sensed by the sensor unit, store the extracted ID number with other ID numbers of other electronic recognition units that previously passed by the sensor unit in the sequence order in which the ID numbers were extracted, and when the electronic recognition unit of the one vehicle is sensed by the sensor unit, match the sequence order and spacing interval of vehicles that previously passed by the sensor unit with the stored ID numbers to determine the location of at least one vehicle that previously passed by the sensor unit.

The electronic recognition unit displays the ID number in the form of code, and the sensor unit may be a code reader reading the code of the ID number.

The ID number may be a vehicle ID number.

The system may further include a detail-location checking module provided at a second end of the assembling process section and configured to calculate a detailed location of a vehicle that is moving along the assembling process section by determining whether a laser beam emitted from a light-emitting part located on one side of the assembling process section has been received by a first light-receiving part located on an opposite side of the assembling process section, and determining whether a portion of the laser beam has not been received by a second light-receiving part located along the assembling process section.

The detail-location checking module may include: the light-emitting part located along the assembling process section at the first or second end thereof and configured to emit the laser beam across the assembling process section; a plurality of light-receiving parts, including the first and second light-receiving parts, located along the assembling process section at the first or second end thereof and configured to receive the laser beam having passed across the assembling process section from the light-emitting part; and a plurality of beam-splitters, each provided between the light-emitting part and a corresponding light-receiving part, and configured to allow a portion of the laser beam having passed across the assembling process section from the light-emitting part to be transmitted therethrough and introduced into the corresponding light-receiving part, and allow the remainder of the laser beam that has not been transmitted to be reflected across the assembling process section.

The detail-location checking module may be communicatively connected to the control unit, location information about the light-emitting parts and the light-receiving parts may be stored in the control unit, and the control unit may be configured such that, when the laser beam emitted from the light-emitting part is projected onto a vehicle moving along the assembling process section such that the laser beam is not received by a particular light-receiving part among the light-receiving parts located behind the moving vehicle, a detailed location of the vehicle is calculated based on the location of at least one light-receiving part at which the laser beam is received.

According to another aspect of the present invention, there is provided a vehicle-location recognition method using the vehicle-location recognition system, the method including: detecting electronic recognition units of the vehicles, including the one vehicle, using the sensor unit when the vehicles enter the assembling process section at regular intervals and pass by the sensor unit; extracting the ID numbers of the vehicles from the electronic recognition units; storing the extracted ID numbers in the sequence order in which they are extracted; and when the one vehicle among the vehicles is detected by the sensor unit, matching the sequence order and spacing interval of vehicles having previously passed by the sensor unit with the sequentially stored ID numbers to determine the location of the particular vehicle among the vehicles having previously passed by the sensor unit.

According to a further aspect of the present invention, there is provided a vehicle assembly-history management system using the vehicle-location recognition system, the management system including: a second sensor unit having a sensing area ranging to a certain distance from the second sensor unit within the assembling process section; an assembling tool having a second electronic recognition unit attached thereto and configured to be sensed by the second sensor unit; and a tool controller connected to the assembling tool and configured to provide an actual assembling torque value and an assembling process signal to the control unit when an assembling process of a vehicle is carried out by the assembling tool, wherein the control unit is configured to, when the tool controller generates the assembling process signal, determine a location of the assembling tool having performed the corresponding assembling process by determining a location of the second electronic recognition unit detected by the second sensor unit.

The control unit can further be configured to store assembling history of a vehicle on which the assembling process has been performed by matching (i) the ID number of a vehicle that was determined as being closest to the assembling tool using the location recognition system by determining the location of the assembling tool, with (ii) the actual assembling torque value applied during the assembling process to the vehicle on which the assembling process has been performed by the assembling tool.

The second electronic recognition unit may be an ultra wideband (UWB) tag, and the second sensor unit may be a UWB sensor having a sensing area ranging to a certain distance and sensing the UWB tag within the sensing area.

According to the present invention, even when a worker does not perform an assembling operation in a sequential manner according to the vehicle-entry sequence, or when a worker does not perform an assembling operation in a defined assembling process section, a vehicle on which an actual assembling process is performed can be identified and associated with information about the assembling process, thereby providing the effect of managing the history of assembling operations.

Further, the vehicle-location recognition system can precisely determine the locations of vehicles entering the assembling process section. Particularly, an electronic recognition unit such as a coded barcode is used as a vehicle-recognition element instead of a tag and a sensor, such that costs associated with providing and managing tags can be eliminated, and problems such as battery discharge and damage of tags can also be solved.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Figure 1:
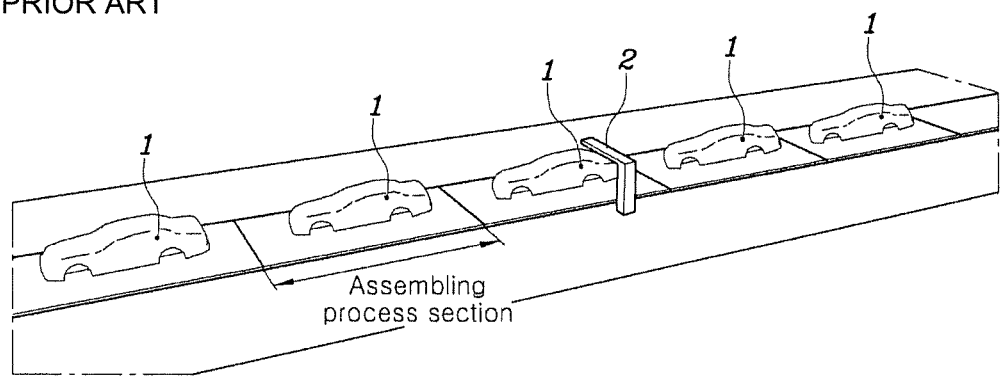
FIG. 1 is a view showing a vehicle-location recognition system according to the related art.

Reference will now be made in greater detail to various embodiments of the invention, examples of which are illustrated in the accompanying drawings. Wherever possible, the same reference numerals will be used throughout the drawings and the description to refer to the same or like parts.

Figure 2:
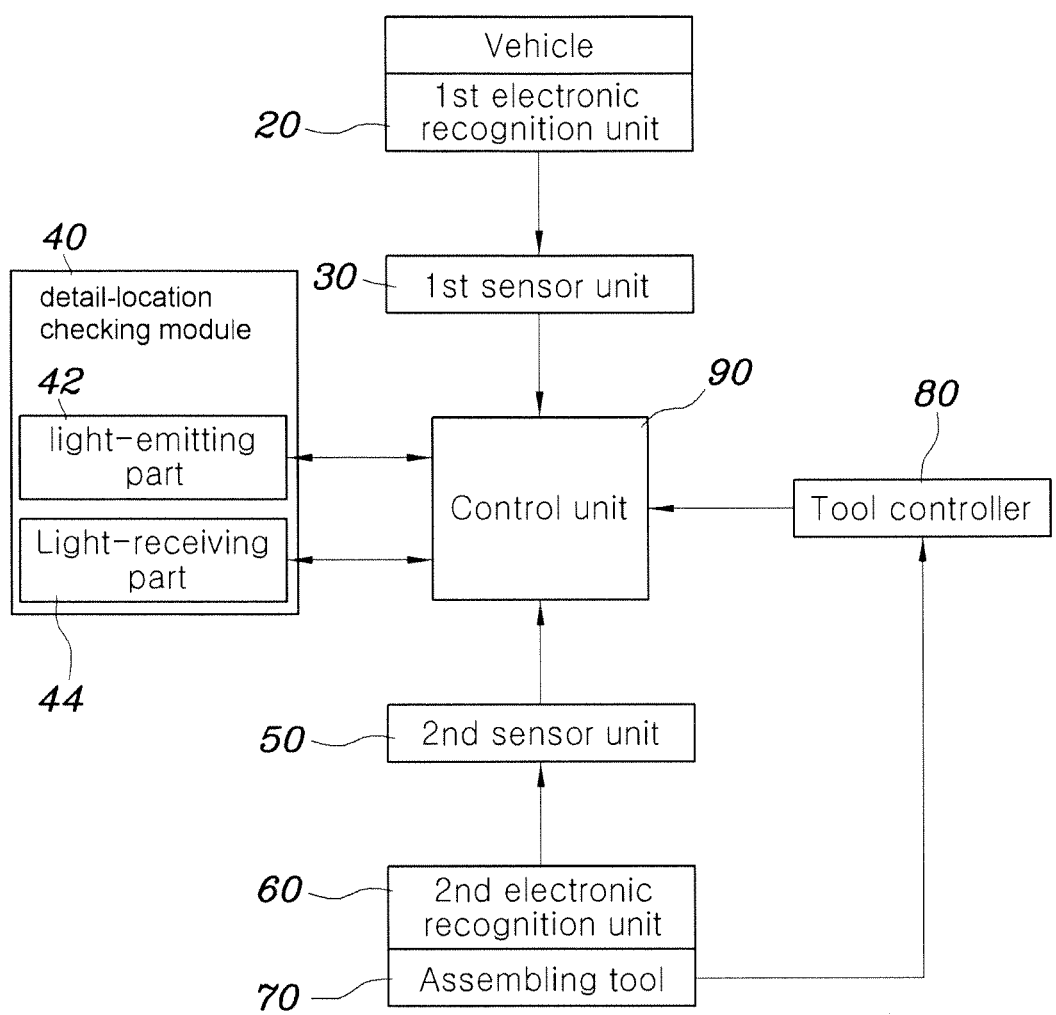
FIG. 2 is a view showing an illustrative vehicle-location recognition system and an illustrative assembling processes-history management system using the same according to the present invention.
Figure 3:
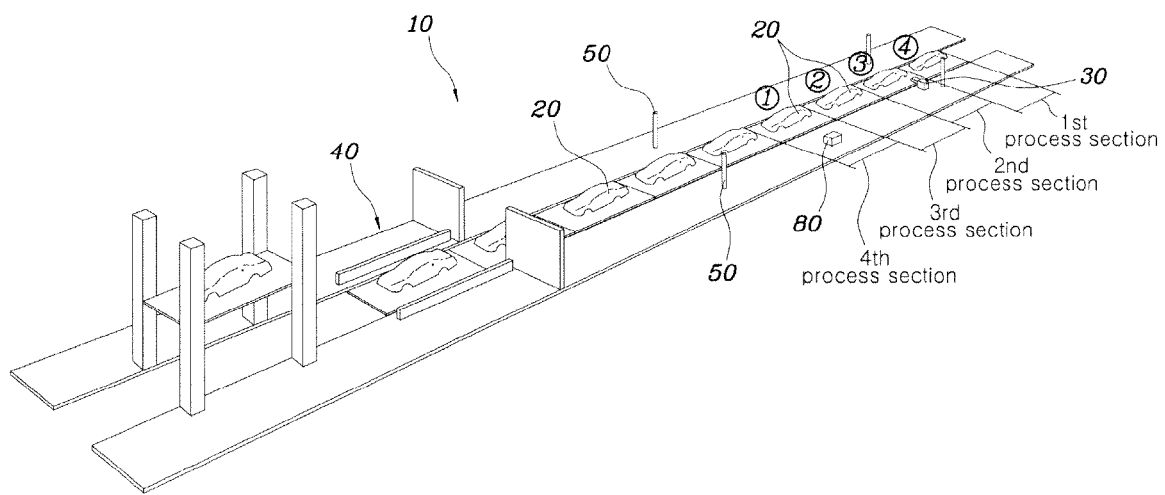
FIG. 3 is a schematic view illustrating the use of the vehicle-location recognition system and the assembling processes-history management system using the same in a vehicle assembly line according to the present invention.

FIG. 2 is a view showing an illustrative vehicle-location recognition system and an illustrative assembling processes-history management system using the same according to the present invention, and FIG. 3 is a schematic view illustrating the use of the vehicle-location recognition system and the assembling processes-history management system using the same in a vehicle assembly line according to the present invention.

The vehicle-location recognition system may generally include an assembling process section 10 and a control unit 90. The assembling process section 10 can include one or more sensor units 30 used for sensing electronic recognition unit(s) 20 located on vehicles on the vehicle assembly line.

Referring to FIGS. 2 and 3 specifically, the vehicle-location recognition system includes one or more electronic recognition unit(s) 20 provided in respective vehicles. The vehicles are located on an assembly line, and are sequentially introduced into an assembling process section 10 as the line (and the vehicles located thereon) is moved while maintaining a certain interval between vehicles. Each electronic recognition unit 20 stores an ID number of a corresponding vehicle. A sensor unit 30 is provided at a first end of an assembling process section 10 and is used for sensing the electronic recognition unit 20 of a vehicle that passes by a location of the sensor unit 30 of the corresponding assembling process section 10. A control unit 90 stores ID numbers of the electronic recognition units 20 sensed by the sensor unit 30, and is used to determine and check the sequence order and spacing interval of the vehicles along the line so as to determine a location of a certain vehicle in the assembling process section 10.

In a particular embodiment, the vehicle-location recognition system may include an assembling process section 10 in which the vehicles are moved while maintaining a certain spacing interval between vehicles. Electronic recognition units 20 are provided in respective vehicles which are introduced into the assembling process section 10, and each store an ID number of the respective/corresponding vehicle. A sensor unit 30 is provided at a first end of the assembling process section 10 and is used for sensing the electronic recognition unit 20 of a vehicle as the vehicle passes by a location of the sensor unit 30 in the assembling process section 10. A control unit 90 is connected with the sensor unit(s) 30 so as to extract the ID numbers of the electronic recognition units 20 sensed by the sensor unit(s) 30, store the extracted ID numbers in the sequence order as they were sensed and extracted, and when a certain vehicle is sensed by the sensor unit 30, match the sequence order of the vehicles and the spacing interval of the vehicles that passed by the sensor unit 30 with the stored ID numbers in order to determine and/or check the locations of the vehicles that have passed by the sensor unit 30. Using the stored sequence order and spacing interval information stored by control units of other process sections, the vehicle-location recognition system may thus know (or predict) the location of a particular vehicle before the vehicle is sensed by the sensor units 30 of the assembling process section 10 based on the sensing of other vehicles that precede the particular vehicle in the sequence order.

The assembling process section 10 is one section of an assembly line in which parts are assembled into or onto vehicles in the course of manufacturing vehicles. Preferably, target vehicles are carried on and conveyed along the assembly line on a conveyor belt. Vehicles that are to be conveyed along the assembly line are conveyed at regular spacing intervals, and in a fixed sequence order, by the conveyor belt as shown in FIG. 3.

The electronic recognition unit 20 is provided in respective vehicles on the assembly line, including vehicles which enter the assembling process section 10, and each electronic recognition unit 20 stores an ID number of a corresponding vehicle.

Each electronic recognition unit 20 may display the ID number in the form of code, preferably a barcode, or other dimensional code. Further, the ID number may be a vehicle ID number for uniquely identifying a particular vehicle among other vehicles located on a same assembly line, or uniquely identifying a particular vehicle among other vehicles of a same make and/or model.

The sensor unit 30 may be installed at a first end of the assembling process section 10, preferably at an end from which the assembling process section starts, so as to sense a vehicle as it enters the assembling process section 10. That is, the sensor unit 30 recognizes a vehicle by detecting the electronic recognition unit 20 of the vehicle that passes by the sensor unit 30 along the assembling process section 10.

Here, the sensor unit 30 may be a code terminal which can read codes (e.g., a barcode reader), because the electronic recognition unit 20 may be provided in the form of code.

The control unit 90 is connected with the sensor unit 30, and is configured to extract the ID numbers of the electronic recognition units 20 sensed by the sensor unit 30, and sequentially digitize and store the same in the order as they were sensed extracted. Further, when a certain vehicle passes by the sensor unit 30 and the electronic recognition unit 20 of the vehicle is sensed by the sensor unit 30, the control unit 90 verifies whether the sequence order and spacing interval of the vehicles that previously passed by the sensor unit 30 match with the stored ordered sequence of ID numbers. The verification enables the control unit 90 to check that the locations of vehicles that previously passed by the sensor unit 30 before the certain vehicle passes by corresponds to the locations of the vehicles that can be determined based on the stored sequence order and spacing interval information.

Since vehicles entering the assembling process section 10 are conveyed at regular spacing intervals, at the time when a certain vehicle passes by the sensor unit 30, it can be determined where vehicles that already passed by the sensor unit 30 are in the assembling process section 10 by using the ordered sequence of ID numbers that were sequentially digitized and stored by the sensor unit 30 and control unit 90.

For example, as shown in FIG. 3, when a vehicle (e.g., vehicle No. 4) passes by the sensor unit 30 and enters a "1st process section", the control unit 90 can calculate that vehicles Nos. 1, 2, and 3 are respectively located at a "4th process section", a "3rd process section", and a "2nd process section" using the ordered sequence of vehicle ID numbers for vehicles Nos. 1, 2, and 3 that were sequentially stored in the control unit 90 when the vehicles previously passed by the sensor unit 30.

Thus, according to the present invention, locations of vehicles entering and progressing through the assembling process section 10 can be precisely determined. Further, separate tags for recognition of each vehicle are not required (e.g., tags may be placed on only some (but not all) of the vehicles, and the location of the remaining tag-less vehicles can be determined based on the sensed/extracted positions of the vehicles having tags), so that a cost and a process for tags can be eliminated, and problems such as battery discharge and damage of tags can also be solved.

In the meantime, a detail-location checking module 40 as shown in FIG. 3 is provided in the assembling process section 10 in order to obtain a detailed location of a vehicle in the assembling process section. The detailed location can, in turn, be used to determine a process number and a detail position of a process section (e.g., 1st, 2nd, 3rd, or 4th process sections of FIG. 3) within which the vehicle or other vehicles in the sequence order are located, and then calculate a more precise location of the vehicle using the former data.

Such a detail-location checking module 40 is provided at a second end of the assembling process section 10 as shown in FIG. 3, and the detail-location checking module 40 is used to calculate a detailed location of a vehicle that is conveyed along the assembly line in the assembling process section 10. In particular, the detailed location is calculated by determining whether a laser beam emitted from a light-emitting part 42 located at the detail-location checking module 40 has been received by a light-receiving part 44 of the detail-location checking module 40, and/or determining where the laser beam has or has not been received.

Specifically, the detail-location checking module 40 may include a light-emitting part 42 which is provided along the assembling process section 10 at the first or second end thereof to emit a laser beam towards the assembling process section 10. A plurality of light-receiving parts 44 are provided along the assembling process section 10 at the first or second end thereof to receive the laser beam having passed by the assembling process section 10 from the light-emitting part 42. A plurality of beam-splitters 46 are provided between the light-emitting part 42 and the light-receiving parts 44 to allow a portion of the laser beam having passed by the assembling process section 10 from the light-emitting part 42 to be transmitted therethrough and introduced into one of the light-receiving parts 44 and allow the remainder of the laser beam that has not been transmitted to be reflected from surfaces of the beam-splitters towards the assembling process section 10.

Figure 4:
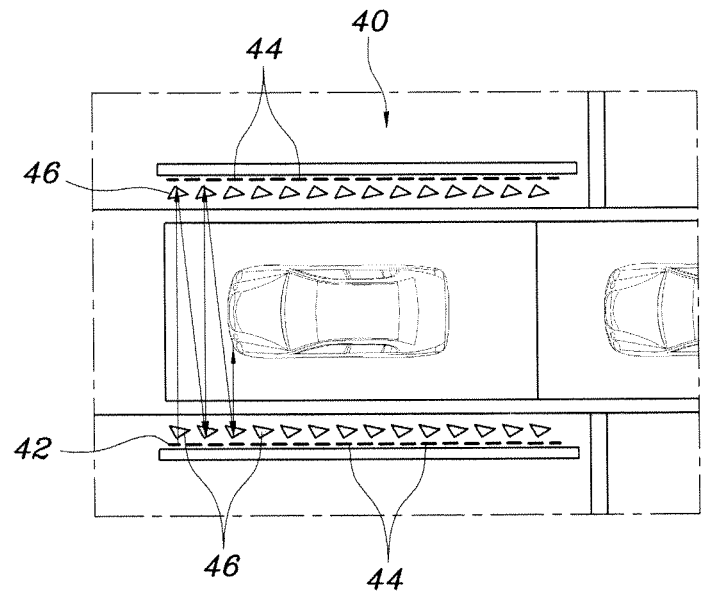
FIG. 4 is a detailed view illustrating a detail-location checking module of the vehicle-location recognition system during assembly of a vehicle.
Figure 5:
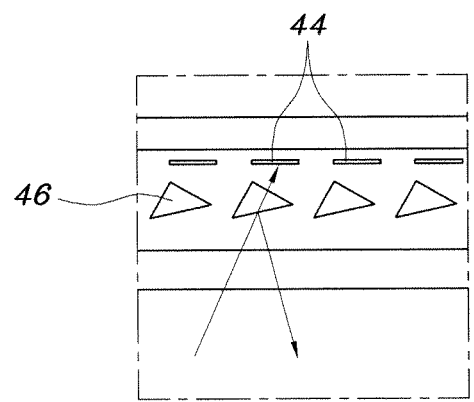
FIG. 5 is a further detailed view illustrating the operation of a beam-splitter of the detail-location checking module.

The light-emitting part 42 and the light-receiving parts 44 are provided at a first or a second end of the assembling process section 10 along the longitudinal direction thereof, and the beam-splitters 46 are provided in proximity to the light-receiving parts 44 such that they face in the direction toward which the light-emitting part 42 is provided. Thus, a laser beam as shown in FIG. 4 is directed from the light-emitting part 42 located at a front end of the detail-location checking module 40 and on one side of the assembling process section 10 to the first beam-splitter 46 which is provided at a front end of the detail-location checking module 40 and on another side of the assembling process section 10 opposite to the light-emitting part 42. The laser beam is incident on the beam-splitter 46 and, as shown in FIGS. 4 and 5, is reflected in part back across the assembling process section 10 towards the one side having the light-emitting part 42, and is transmitted in part through the beam-splitter 46 to a light-receiving part 44 located behind the beam-splitter 46.

Additional beam-splitters 46 and light-receiving parts 44 can be spaced regularly along the detail-location checking module 40 on both sides of the assembling process section 10 such that the laser beam can be repeatedly reflected-in-part across the assembling process section 10 between various beam-splitters 46 and transmitted-in-part through each beam-splitter 46 to a respective light-receiving part 44. The light-receiving parts 44, as they are mounted close together along the detail-location checking module 40 on both sides of the assembling process section 10, can determine the location of a vehicle more precisely. However, a laser beam emitted from the light-emitting part 42 has a limited reflection distance, so that multiple light-emitting parts 42 may be mounted at regular intervals along the detail-location checking module 40.

The detail-location checking module 40 can be communicatively connected to the control unit 90 such that the control unit 90 can determine detailed locations of vehicles which are within the detail-location checking module 40 by causing a laser beam to be emitted by the light-emitting part 42 and determining which of the plurality of light-receiving parts 44 spaced regularly along the sides of the assembling process section 10 receive the laser beam.

More specifically, the control unit 90 stores location information about the light-emitting part(s) 42 and the light-receiving parts 44 therein. Further, when a vehicle has not yet entered the assembling process section 10 in which the detail-location checking module 40 is mounted, a laser beam emitted from the light-emitting part 42 is projected across the assembling process section 10 such that the laser beam is received by a light-receiving part 44 opposite the light-emitting part 42. However, once a vehicle enters the assembling process section 10 in which the detail-location checking module 40 is mounted, the laser beam emitted from the light-emitting part 42 is projected onto the vehicle, such that the laser beam is no longer received by the light-receiving part 44 opposite the light-emitting part 42. Thus, upon determining that the laser beam emitted from the light-emitting part 42 no longer is received at the opposite light-receiving part 44, the control unit 90 can calculate a detailed location of the vehicle based on the location of the light-receiving part 44 to which the laser beam was finally incident.

As such, the vehicle-location recognition system can determine a location of a vehicle using the data stored in the control unit 90. Specifically, when vehicles are conveyed at regular intervals along the assembling process section 10 and pass by the sensor unit 30, the control unit 90 detects the electronic recognition units 20 provided in the vehicles using the sensor unit 30, extracts the ID numbers of the vehicles which are stored in the electronic recognition units 20, and stores the ID numbers in the sequence order as they are sensed and extracted. Then, when a particular vehicle is detected by the sensor unit 30, the control unit 90 can determine the locations of the vehicles that have previously passed by the sensor unit 30 before the particular vehicle by matching the sequence order and spacing interval of the vehicles that previously passed by the sensor unit 30 with the ID numbers that were sequentially stored.

Next, a vehicle-location recognition method using the vehicle-location recognition system will be described. The vehicle-location recognition method generally includes a step of detecting an electronic recognition unit 20, a step of extracting ID numbers, a step of storing the ID numbers, and a step of determining or verifying locations of vehicles.

Specifically, in the detection step, when vehicles are conveyed at regular spacing intervals along the assembling process section 10 and pass by the sensor unit 30, the sensor unit 30 detects the electronic recognition units 20 of the vehicles.

In the extraction step, ID numbers of vehicles, preferably vehicle ID numbers, which are stored in the electronic recognition units 20 are extracted from data received by the sensor unit 30 from each electronic recognition unit 20 as it is sensed by the sensor unit 30.

In the ID number-storage step, each extracted ID number is sequentially digitized and stored in sequence order in a memory of the control unit 90 along with information about spacing intervals between each vehicle.

In the vehicle-location checking step, when a particular vehicle is detected by the sensor unit 30, locations of vehicles that previously passed by the sensor unit 30 before the particular vehicle are determined or verified by matching the sequence order and spacing interval of the vehicles that previously passed by the sensor unit 30 with the vehicle ID numbers that were sequentially stored.

Thus, when vehicles enter the assembling process section 10 in the course of manufacturing, the locations of the vehicles that are conveyed along the assembling process section 10 can be precisely determined and/or verified.

Further, according to a further aspect of the present invention, a vehicle assembly-history management system onto which the vehicle-location recognition system is grafted is provided in order to manage a history of assembling operations conducted in the assembling process section 10. The management system generally includes the vehicle-location recognition system, a second sensor unit 50, an assembling tool 70, a tool controller 80, and a control unit 90.

Specifically, the vehicle-location recognition system checks a location of a vehicle having a first electronic recognition unit 20 when conveyed along the assembling process section 10 by detecting the first electronic recognition unit 20 using the first sensor unit 30. As such, the vehicle-location recognition system may generally include the assembling process section 10, the first electronic recognition unit 20, the first sensor unit 30, and the control unit 90.

More generally, the vehicle-location recognition system may include an assembling process section 10 in which the vehicles are moved while maintaining a certain spacing interval between vehicles. A first electronic recognition unit 20 is provided in a respective vehicle which is introduced into the assembling process section 10, and stores an ID number of the vehicle therein. A first sensor unit 30 is provided at a first end of the assembling process section 10 for sensing the first electronic recognition unit 20 of the vehicle as it passes by a location of the sensor unit 30 along the assembling process section 10. A control unit 90 is connected with the first sensor unit 30 so as to extract the ID numbers of the first electronic recognition units 20 sensed by and received from the first sensor unit 30, and store the ID numbers in the order as they were received and extracted. Upon a particular vehicle being sensed by the first sensor unit 30, the control unit 90 matches the sequence order and spacing interval of vehicles that previously passed by the first sensor unit 30 with stored ID numbers of the vehicles that previously passed by the first sensor unit 30 to determine the locations of the vehicles that previously passed by the first sensor unit 30 before the particular vehicle.

Here, the vehicle assembly-history management system includes a vehicle-location recognition system that has a structure that is substantially similar to that of the aforementioned vehicle-location recognition system, so a detailed description thereof will be omitted.

The vehicle assembly-history management system additionally includes a second sensor unit 50 having a sensing area ranging from the sensor unit's immediate proximity to a certain distance away from the second sensor unit 50. The certain distance may correspond to a distance within range of the assembling process section 10, so that the second sensor unit 50 can detect a second electronic recognition unit 30 located within the certain distance from the second sensor unit 50, such as a second electronic recognition unit 30 located within the assembling process section 10.

In one example, the second sensor unit 50 may be an ultra wideband (UWB) sensor which can recognize an UWB tag within its sensing area.

The assembling tool 70 is a tool that is provided within the sensing area and used to assemble parts onto a vehicle body. The assembling tool may be a pneumatic or electric tool that is capable of assembling parts with a predetermined torque value.

The assembling tool 70 is provided with a second electronic recognition unit 60, which will be detected by the second sensor unit 50.

In one example, the second electronic recognition unit 60 may be an ultra wideband (UWB) tag, and the second sensor unit 50 may be an UWB sensor that is capable of recognizing the UWB tag.

The tool controller 80 is connected to the assembling tool 70 so as to provide an actual assembling torque value and an assembling process signal during assembly of a vehicle using the assembling tool 70. The tool controller 80 is also communicatively connected to the control unit 90 and can transmit the actual assembling torque value (and optionally the assembling process signal) to the control unit 90.

The control unit 90 is connected to the tool controller 80, and receives an assembling process signal from the tool controller 80. The control unit 90 is also connected to the second sensor unit 50, and can thus determine a location of the assembling tool 70 having performed the corresponding assembling process by determining a location of the second electronic recognition unit 60 detected by the second sensor unit 50. The control unit 90 can thus store assembling history of the vehicle on which the assembling process has been performed by matching the ID number of the vehicle that was determined as being closest to the assembling tool via the location recognition system, with the actual assembling torque value of the vehicle on which the assembling process has been performed by the assembling tool 70, thereby managing the assembling history of the vehicle on which the assembling process has been performed in the assembling process section 10.

According to the above construction, even when a worker does not perform an assembling operation in a sequential manner according to the vehicle-entry sequence, or when a worker does not perform an assembling operation within a defined assembling process section, the control unit 90 can determine the is particular vehicle on which the assembling process is performed, thereby precisely managing the history of assembling operations.

The vehicle assembly-history management system according to the present invention may be integrated with the control unit 90. Specifically, when vehicles are conveyed at regular spacing intervals along the assembling process section 10, and when the vehicles pass by the first sensor unit 30, the control unit 90 detects the first electronic recognition units 20 of the vehicles using the first sensor unit 30, extracts the vehicle ID numbers from the first electronic recognition units 20, sequentially digitizes and stores the extracted ID numbers, and when a particular vehicle is sensed by the first sensor unit 30, matches the sequence order and spacing interval of the vehicles that previously passed by the first sensor unit 30 with the stored ID numbers to determine or verify the locations of the vehicles that previously passed by the first sensor unit 30 before the particular vehicle.

Further, the control unit 90 detects the second electronic recognition unit 60 provided in the assembling tool 70 within the sensing area of the second sensor unit 50 by communicating with the second sensor unit 50, and receives an actual assembling torque value and an assembling process signal from the assembling tool 70 via the tool controller 80 when a vehicle is assembled by the assembling tool 70. The control unit 90 then determines a location of the second electronic recognition unit 60 when the input assembling process signal is received, thereby determining a location of the assembling tool 70 having performed the corresponding assembling process. Finally, the control unit 90 matches the ID number of a vehicle that is closest to the assembling tool 70 with the actual assembling torque value received from the assembling tool 70, and stores a history of assembling operations that is performed on each vehicle.

Next, a vehicle assembly-history management method using the above vehicle assembly-history management system will be described.

The vehicle assembly-history management method may generally include a step of detecting a first electronic recognition unit 20, a step of extracting ID numbers, a step of storing the ID numbers, a step of determining locations of vehicles, a step of detecting a second electronic recognition unit 60, a step of generating an assembling signal, a step of determining a location of an assembling tool 70, and a step of storing a history of assembling operations.

Specifically, in the detection step, when vehicles are conveyed at regular spacing intervals along the assembling process section 10 and pass by the first sensor unit 30, the first sensor unit 30 detects the first electronic recognition units 20 of the vehicles.

In the extraction step, ID numbers of vehicles, preferably vehicle ID numbers, which were stored in the first electronic recognition units 20, are sensed and extracted.

In the ID number-storage step, the extracted ID numbers are sequentially digitized and stored in a memory of the control unit 90.

In the step of determining locations of vehicles, when a particular vehicle is detected by the first sensor unit 30, locations of vehicles that previously passed by the first sensor unit 30 before the particular vehicle are determined by matching the sequence order and spacing interval of the vehicles that previously passed by the first sensor unit 30 with the vehicle ID numbers that were sequentially stored by the control unit 90 at the time each vehicle passed by the first sensor unit 30.

In the step of detecting the second electronic recognition unit 60, the second electronic recognition unit 60 provided in the assembling tool 70 is detected within the sensing area of the second sensor unit 50.

In the step of generating the assembling signal, when an assembling operation is performed on a vehicle using the assembling tool 70, the tool controller 80 provides an actual assembling torque value to the assembling tool 70 and an assembling process signal, and then transmits the same to the control unit 90.

In the step of determining a location of the assembling tool 70, a location of the second electronic recognition unit 60 is determined at the time the assembling process signal is provided by the tool controller 80, thereby determining a location of the assembling tool 70 that performed the corresponding assembling operation.

Finally, in the step of storing a history of assembling operations, a history of assembling operations performed on a vehicle is stored in the control unit 90 by matching the ID number of a vehicle that is closest to the assembling tool 70 with the actual assembling torque value of the assembling tool 70.

As a result, based on information about vehicle-locations obtained via the above vehicle-location recognition system and about a location of the assembling tool 70 obtained via the UWB system, at the time when the assembling process signal is generated by the tool controller 80, the ID number of a vehicle that is closest to the assembling tool 70 and the actual assembling torque value are matched to each other, and a matching result is stored in the control unit 90.

Accordingly, even if a worker does not perform an assembling operation in a sequential manner according to the vehicle-entry sequence, or otherwise a worker does not perform an assembling operation in a defined assembling process section, a vehicle on which an actual assembling process is performed can be identified and associated with information about the assembling process, thereby managing the history of assembling operations.

Further, the vehicle-location recognition system can precisely determine the locations of vehicles entering the assembling process section 10. Particularly, an electronic recognition unit 20 such as a coded barcode is used as a vehicle-recognition element instead of a tag and a sensor, such that costs associated with providing and managing tags can be eliminated, and problems such as battery discharge and damage of tags can also be solved.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A vehicle-location recognition system comprising:
    an electronic recognition unit provided in one vehicle which is introduced into an assembling process section in which vehicles are conveyed in a sequence order while maintaining a certain spacing interval between vehicles, and storing an ID number of the one vehicle;
    a sensor unit provided at a first end of the assembling process section for sensing the electronic recognition unit of the one vehicle when the one vehicle passes by a location of the sensor unit along the assembling process section; and
    a control unit for storing the ID number of the electronic recognition unit sensed by the sensor unit, for storing information relating to the sequence order and spacing interval of the vehicles conveyed in the assembling process section, and for determining a location in the assembling process section of a particular vehicle among the vehicles conveyed in the assembling process section,
    wherein the control unit is configured to extract the ID number of the electronic recognition unit sensed by the sensor unit, store the extracted ID number with other ID numbers of other electronic recognition units that previously passed by the sensor unit in the sequence order in which the ID numbers were extracted, and when the electronic recognition unit of the one vehicle is sensed by the sensor unit, match the sequence order and spacing interval of vehicles that previously passed by the sensor unit with the stored ID numbers to determine the location of at least one vehicle that previously passed by the sensor unit.

2. The vehicle-location recognition system according to claim 1, wherein the electronic recognition unit displays the ID number in the form of code, and the sensor unit is a code reader reading the code of the ID number.

3. The vehicle-location recognition system according to claim 1, wherein the ID number is a vehicle ID number.

4. The vehicle-location recognition system according to claim 1, further comprising:
   a detail-location checking module provided at a second end of the assembling process section and configured to calculate a detailed location of a vehicle that is moving along the assembling process section by determining whether a laser beam emitted from a light-emitting part located on one side of the assembling process section has been received by a first light-receiving part located on an opposite side of the assembling process section, and determining whether a portion of the laser beam has not been received by a second light-receiving part located along the assembling process section.

5. The vehicle-location recognition system according to claim 4, wherein the detail-location checking module comprises:
   the light-emitting part located along the assembling process section at the first or second end thereof and configured to emit the laser beam across the assembling process section;
   a plurality of light-receiving parts, including the first and second light-receiving parts, located along the assembling process section at the first or second end thereof and configured to receive the laser beam having passed across the assembling process section from the light-emitting part; and
   a plurality of beam-splitters, each provided between the light-emitting part and a corresponding light-receiving part, and configured to allow a portion of the laser beam having passed across the assembling process section from the light-emitting part to be transmitted therethrough and introduced into the corresponding light-receiving part, and allow the remainder of the laser beam that has not been transmitted to be reflected across the assembling process section.

6. The vehicle-location recognition system according to claim 5, wherein:
   the detail-location checking module is communicatively connected to the control unit,
   location information about the light-emitting parts and the light-receiving parts is stored in the control unit, and
   the control unit is configured such that, when the laser beam emitted from the light-emitting part is projected onto a vehicle moving along the assembling process section such that the laser beam is not received by a particular light-receiving part among the light-receiving parts located behind the moving vehicle, a detailed location of the vehicle is calculated based on the location of at least one light-receiving part at which the laser beam is received.

7. A vehicle-location recognition method using the vehicle-location recognition system according to claim 1, the method comprising:
   detecting electronic recognition units of the vehicles, including the one vehicle, using the sensor unit when the vehicles enter the assembling process section at regular intervals and pass by the sensor unit;
   extracting the ID numbers of the vehicles from the electronic recognition units;
   storing the extracted ID numbers in the sequence order in which they are extracted; and
   when the one vehicle among the vehicles is detected by the sensor unit, matching the sequence order and spacing interval of vehicles having previously passed by the sensor unit with the sequentially stored ID numbers to determine the location of the particular vehicle among the vehicles having previously passed by the sensor unit.

8. A vehicle assembly-history management system using a vehicle-location recognition system comprising:
   an electronic recognition unit provided in one vehicle which is introduced into an assembling process section in which vehicles are conveyed in a sequence order while maintaining a certain spacing interval between vehicles, and storing an ID number of the one vehicle;
   a sensor unit provided at a first end of the assembling process section for sensing the electronic recognition unit of the one vehicle when the one vehicle passes by a location of the sensor unit along the assembling process section; and
   a control unit for storing the ID number of the electronic recognition unit sensed by the sensor unit, for storing information relating to the sequence order and spacing interval of the vehicles conveyed in the assembling process section, and for determining a location in the assembling process section of a particular vehicle among the vehicles conveyed in the assembling process section,
   wherein the control unit is configured to extract the ID number of the electronic recognition unit sensed by the sensor unit, store the extracted ID number with other ID numbers of other electronic recognition units that previously passed by the sensor unit in the sequence order in which the ID numbers were extracted, and when the electronic recognition unit of the one vehicle is sensed by the sensor unit, match the sequence order and spacing interval of vehicles that previously passed by the sensor unit with the stored ID numbers to determine the location of at least one vehicle that previously passed by the sensor unit,
   the management system comprising:
   a second sensor unit having a sensing area ranging to a certain distance from the second sensor unit within the assembling process section;
   an assembling tool having a second electronic recognition unit attached thereto and configured to be sensed by the second sensor unit; and
   a tool controller connected to the assembling tool and configured to provide an actual assembling torque value and an assembling process signal to the control unit when an assembling process of a vehicle is carried out by the assembling tool,
   wherein the control unit is configured to, when the tool controller generates the assembling process signal, determine a location of the assembling tool having performed the corresponding assembling process by determining a location of the second electronic recognition unit detected by the second sensor unit.

9. The vehicle assembly-history management system according to claim 8, wherein the control unit is further configured to store the assembling history of a vehicle on which the assembling process has been performed by matching (i) the ID number of a vehicle that was determined as being closest to the assembling tool using the location recognition system by determining the location of the assembling tool, with (ii) the actual assembling torque value applied during the assembling process to the vehicle on which the assembling process has been performed by the assembling tool.

10. The vehicle assembly-history management system according to claim 8, wherein the second electronic recognition unit is an ultra wideband (UWB) tag, and the second sensor unit is a UWB sensor having a sensing area ranging to a certain distance and sensing the UWB tag within the sensing area.

* * * * *